G. PETERSEN.
MEANS FOR UNCHOKING WASTE PIPES.
APPLICATION FILED JULY 18, 1913.

1,180,182.

Patented Apr. 18, 1916.

Witnesses
Frederick L. Fox,
U. B. Hillyard.

Inventor
George Petersen,
By Victor J. Evans.
Attorney

UNITED STATES PATENT OFFICE.

GEORGE PETERSEN, OF SPOKANE, WASHINGTON.

MEANS FOR UNCHOKING WASTE-PIPES.

1,180,182.            Specification of Letters Patent.      Patented Apr. 18, 1916.

Application filed July 18, 1913. Serial No. 779,884.

*To all whom it may concern:*

Be it known that I, GEORGE PETERSEN, a citizen of the United States, residing at Spokane, in the county of Spokane and State of Washington, have invented new and useful Improvements in Means for Unchoking Waste-Pipes, of which the following is a specification.

The invention provides a device which may be used for unchoking waste pipes or for stopping leaky pipes until repairs may be conveniently made, the device consisting essentially of a plug of flexible material which will expand when subjected to internal pressure to cause such plug to fill a waste pipe and form a stopper to prevent the escape of liquid, thereby admitting of such waste pipes being unchoked or stopped in the event of leakage to prevent waste until proper repairs may be effected.

The invention further consists of a plug having an inlet and an outlet, the inlet being of larger relative size than the outlet so that the outflow of liquid from the plug is less than the inflow, with the result that the plug is subjected to an internal pressure which tends to produce an outward pressure to hold the sides of the plug in close contact with the sides of the pipe in which the plug is fitted.

The invention consists of the novel features, details of construction and combination of parts, which hereinafter will be more particularly set forth, illustrated in the accompanying drawing, and pointed out in the appended claim.

Figure 1:
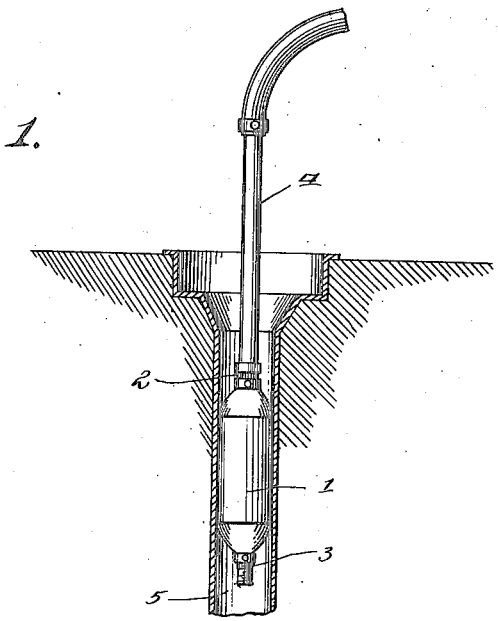
Figure 2:
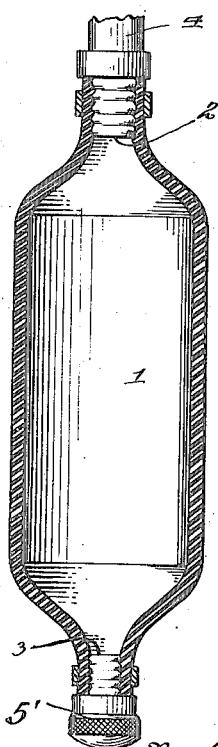

Referring to the drawing, forming a part of the specification, Figure 1 is a detail view, showing the application of the invention. Fig. 2 is a sectional view of the plug, showing one of the terminal openings closed so as to retain the pressure by means of which the plug is expanded when the same is used as a stopper for closing a leak.

Corresponding and like parts are referred to in the following description, and indicated in all the views of the drawing, by the same reference characters.

The plug 1 is preferably elongated and consists of a body constructed of flexible material, such as rubber, textile or a combination of such materials. It is proposed to provide the plugs in various standard sizes to suit different sizes of sewer and waste pipe. The elongated form of plug is preferred since it presents a large surface to come in contact with the inner walls of the pipe, whereby the plug when in position is retained in place against ready displacement. Openings are provided at opposite ends of the plug and for this purpose it is preferred to have the ends of the plug contracted. One of the openings, as 2, constitutes the inlet and the other opening 3 the outlet. The inlet 2 is of larger diameter than the outlet 3, hence the liquid supplied to the plug under pressure tends to enter the same more readily than the tendency to flow outward, with the result that a pressure is created within the plug which causes the latter to expand and to press against the inner walls of a sewer or waste pipe, thereby retaining the plug in position when placed within such pipe, the cap 5', of course, being at this time removed. A tube 4 is adapted to be connected with one end of the plug and is adapted to be coupled to a hydrant or other source of water supply whereby the plug is expanded when in position. When the plug is to be used simply as a stopper for closing a leaky waste pipe or sewer pipe the outlet end 3 is closed by the cap 5', hence the plug is retained in place by the internal pressure. When a sewer or waste pipe is to be unchoked the plug is introduced into the end of such pipe, after which the tube 4 is connected with a hydrant or other source of water supply. When the water is turned on the plug expands and is retained in place in the pipe 5 by frictional engagement. A portion of the water flows from the plug and enters the pipe 5 and being confined in the latter by means of the plug 1 exerts a pressure upon the obstructing matter which is loosened and finally dislodged. When it is required to remove the plug from the pipe the pressure is cut off, thereby permitting the plug to collapse, after which it may be easily withdrawn from the pipe 5.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto. It is to be understood further that the medium for expanding the plug may be water, steam or air.

Having thus described the invention what is claimed as new, is:—

As an improved article of manufacture, a hollow plug comprising an integral cylindrical body of uniform diameter throughout its length and formed of flexible material capable of expansion, said body being elongated and having its ends contracted and terminating in coupling extremities, one of said extremities constituting an inlet and the other an outlet, said inlet being of relatively larger area than the outlet, whereby the fluid medium in passing through the plug maintains an internal pressure sufficient to expand such plug.

In testimony whereof I affix my signature in presence of two witnesses.

GEORGE PETERSEN.

Witnesses:
 ROBERT E. CORKERY,
 ERNEST E. BROWN.